US007013904B2

(12) United States Patent
Kofler

(10) Patent No.: US 7,013,904 B2
(45) Date of Patent: Mar. 21, 2006

(54) PORTABLE MOTORCYCLE COVER

(76) Inventor: Harald Kofler, 408 High Tech Dr., Oakdale, PA (US) 15071

( * ) Notice: Subject to any disclaimer, the term of this patent is extended or adjusted under 35 U.S.C. 154(b) by 155 days.

(21) Appl. No.: 10/697,770

(22) Filed: Oct. 31, 2003

(65) Prior Publication Data

US 2005/0102917 A1 May 19, 2005

(51) Int. Cl.
  *E04H 15/36* (2006.01)
  *B60J 11/00* (2006.01)
(52) U.S. Cl. .................. 135/132; 135/133; 135/137; 135/148; 150/167; 206/335; 296/136.12; 296/136.13
(58) Field of Classification Search ................ 135/132, 135/133, 137, 148; 150/167; 296/136.1, 296/136.11, 136.12, 136.13; 206/335
See application file for complete search history.

(56) References Cited

U.S. PATENT DOCUMENTS

| 609,553 | A | * | 8/1898 | Llloyd ...................... 135/93 |
| 2,598,940 | A | * | 6/1952 | Robie ........................ 135/133 |
| 2,992,649 | A | * | 7/1961 | Roland ...................... 135/133 |
| 3,861,092 | A | | 1/1975 | Dale et al. |
| 3,906,968 | A | * | 9/1975 | Black ........................ 135/132 |
| 4,227,542 | A | * | 10/1980 | Bonfilio ..................... 135/132 |
| 5,013,079 | A | * | 5/1991 | Ho .......................... 296/136.12 |
| 5,159,947 | A | * | 11/1992 | Chuang et al. ............. 135/132 |
| 5,533,616 | A | | 7/1996 | Crawfoot |
| 5,746,237 | A | * | 5/1998 | Arnic ...................... 135/88.06 |
| 5,842,495 | A | * | 12/1998 | Egnew et al. ............... 135/133 |
| 5,921,389 | A | | 7/1999 | Zoffer |
| 5,954,200 | A | | 9/1999 | Allain et al. |
| 6,092,856 | A | * | 7/2000 | Ladensack ............. 296/100.11 |
| 6,349,732 | B1 | * | 2/2002 | Cooper ........................ 135/133 |

* cited by examiner

*Primary Examiner*—Robert Canfield
(74) *Attorney, Agent, or Firm*—Theresa M. Seal

(57) ABSTRACT

A portable motorcycle covering for enclosing and protecting therein a motorcycle includes an elongated floor cover on which the motorcycle rests, and the floor cover has a circumferential lip to prevent water from coming on to the floor cover. A flexible and collapsible protective cover is integrally attached to at least one half of the floor cover and is capable of pivotal movement between an open position, wherein the motorcycle can be placed on the floor cover, and a closed position, wherein the motorcycle is fully enclosed by the protective cover. A plurality of u-shaped crosspieces create a support frame for the protective cover, and the crosspieces pivot in sequential order for creating the support frame and deploying the protective cover when the leading crosspiece positioned adjacent the opening of the protective cover is grasped and pivoted by the individual. The crosspieces are interconnected at their opposed ends to swivel pockets formed on the opposed inner lowermost central regions of the side panels of the protective cover to facilitate the sequential pivotal movement of the crosspieces for opening and closing the protective cover.

16 Claims, 3 Drawing Sheets

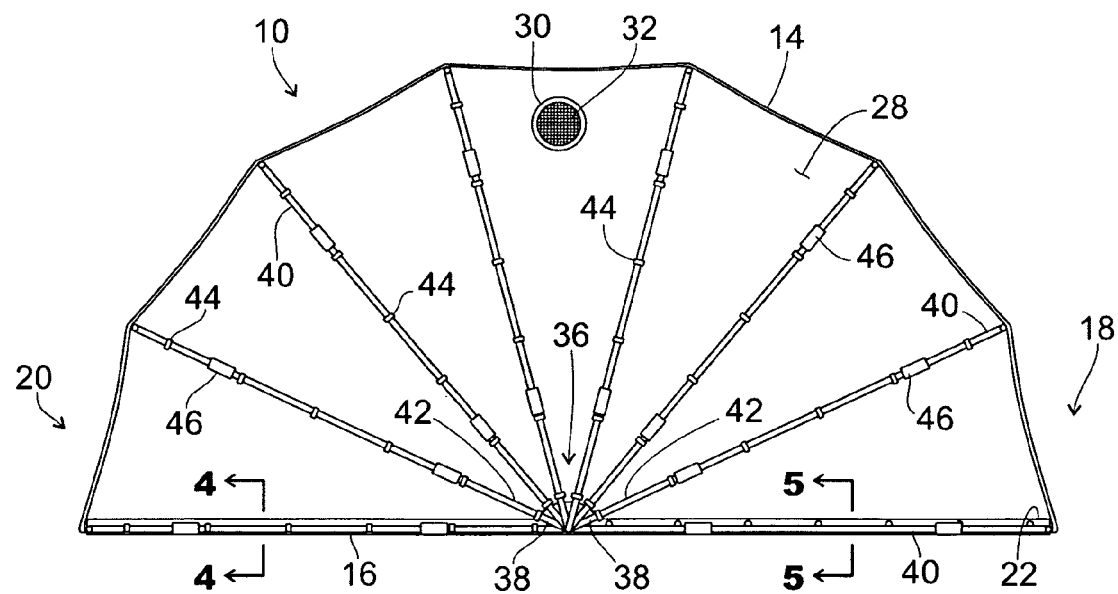
Fig. 3
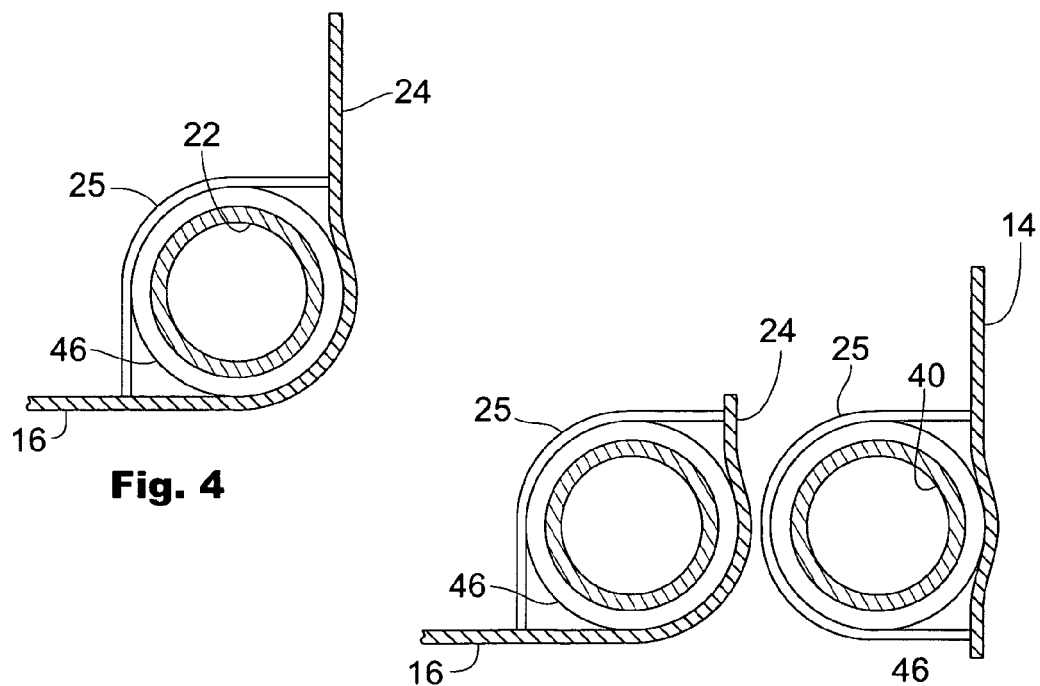
Fig. 4
Fig. 5

PORTABLE MOTORCYCLE COVER

FIELD OF THE INVENTION

The present invention pertains to portable coverings, and, more particularly, pertains to a portable covering for a motorcycle.

BACKGROUND OF THE INVENTION

Along with regular upkeep and maintenance, the protection of an automotive vehicle—or motorcycle—from the damaging and destructive effects of environmental exposure is critical in maintaining and extending the life of the vehicle. It is too well known that vehicles parked outside year round, and subjected to wind, rain, snow, sleet, hail, the gradually corrosive effects of rusting, and temperature variations ranging from sultry summer weather to freezing, sub-zero winter weather, have a shorter life span than those vehicles that are parked indoors or are protectively covered by their owners. For owners of classic and antique vehicles there is an especial concern for protecting the vehicle at all times to maintain and preserve the engine parts and the exterior finish or surface. However, many vehicle owners lack garages to park and store their vehicles; thus, these owners must use other means to protect their vehicles. One of the most common means of vehicle protection is by using a flexible, non-scratch covering, which is simply draped over the vehicle and held on to the vehicle by elastic portions or members at the corners of the covering. While this simple type of covering has some usefulness, it does not protect the lower panels and underside of the vehicle from mud, snow, dirt, stones, and the gradual and destructive effects of moisture accumulating on the exposed panels and vehicle underside. Therefore, more elaborate coverings have been conceived, and the prior art discloses numerous types of protective containers and cases for covering tools, equipment and automotive vehicles that go beyond the simple cloth or sheet-type of cover.

Representative of such prior art protective containers, cases and covers is the Crowfoot patent (U.S. Pat. No. 5,533,616) that discloses a case for a motor bike including a base to which pivotal housings are connected for pivoting in a vertical plane to cover the vehicles. Each of the housings has a vent hole and seals are interposed between the housings for providing a watertight jointure of the housings.

The Zoffer patent (U.S. Pat. No. 5,921,389) discloses a protective cover for wheeled vehicles having a base platform for supporting the vehicle and a pair of flexible side panels that extend upwardly and outwardly from the base. A pair of roof panels are integrally adjoined to the side panels for enclosing the vehicle and the edges of the panels are releasably attachable and detachable from each other.

Nonetheless, despite the ingenuity of the prior art, there remains a need for a protective cover that is easy to setup and use in a relatively brief amount of time, is lightweight and portable, and can be used both indoors and outdoors to protect the vehicle.

SUMMARY OF THE INVENTION

The present invention comprehends portable coverings for vehicles, equipment and the like, and more particularly comprehends a portable covering for motorcycles. The portable motorcycle covering includes a floor cover on which the motorcycles rests, and the floor cover includes a circumferential lip for preventing water from coming on to the floor cover. A floor cover frame in the form of floor cover support members are disposed inboard of the lip in order to maintain the shape of the floor cover. Secured to one half of the floor cover is a flexible, foldable protective cover with the unattached portion of the protective cover defining an opening for receiving the motorcycle. The protective cover is supported by a plurality of u-shaped crosspieces or support members. The crosspiece adjacent the opening can be manually pivoted 180 degrees between an open position and a closed position, and the manual pivotal movement of this leading crosspiece initiates the pivotal movement of all the other crosspieces thereby causing the protective cover to fold and unfold. Thus, the crosspieces pivot in sequence commencing with the leading crosspiece for moving the protective cover between the closed and the open disposition. One crosspiece serves as the central crosspiece and defines the apex of the protective cover when the protective cover is deployed in the fully closed position for enclosing the motorcycle therein. On each side of the protective cover is a vent to minimize and prevent the accumulation or buildup of moisture and condensation within the protective cover.

It is an objective of the present invention to provide a portable motorcycle covering that can be easily and quickly deployed for covering a motorcycle, and is thus very practical for daily usage.

It is another objective of the present invention to provide a portable motorcycle covering that is able to cover and uncover a motorcycle in a brief amount of time and with little effort or exertion.

It is yet another objective of the present invention to provide a portable motorcycle covering that can be used both indoors and outdoors to protect the motorcycle.

It is still yet another objective of the present invention to provide a portable motorcycle covering that doesn't contact any part of the motorcycle when in the deployed state, and thus the user doesn't have to wait for the engine or other parts of the motorcycle to cool off before deployment of the covering.

Another objective of the present invention is to provide a portable motorcycle covering that is manufactured from a non-scratch material so that the motorcycle surface and finish is not marred or scratched.

Still yet another objective of the present invention is to provide a portable motorcycle covering that includes ventilation areas for minimizing the accumulation of condensation and moisture within the covering when the covering is deployed about the motorcycle.

A still further objective of the present invention is to provide a portable motorcycle covering that eliminates the need for storing the motorcycle in rental storage, thus saving the user rental fees.

A still yet further objective of the present invention is to provide a portable motorcycle covering that is affordably priced and includes a locking mechanism for providing additional protection.

These and other objects, features and advantages will become apparent to one skilled in the art upon a perusal of the following detailed description read in conjunction with the accompanying drawings.

BRIEF DESCRIPTION OF THE DRAWINGS

FIG. 3 is a side elevational view of the portable motorcycle covering illustrating the disposition of the crosspieces when the covering is in the fully closed disposition, and the attachment of the crosspiece ends to the swivel pocket;

FIG. 4 is a sectioned elevational view of the portable motorcycle covering illustrating an interior end of the protective cover and one of the support members comprising the floor cover frame;

FIG. 5 is a sectioned elevational view of the portable motorcycle covering illustrating the opening of the protective cover closed over the lip of the floor cover frame;

DETAILED DESCRIPTION OF THE PREFERRED EMBODIMENT

Illustrated in FIGS. 1–7 is a portable covering 10 for equipment, tools, furnishings and vehicles, and is especially used for year round protection of motorcycles 12. The portable covering 10 can be located both outdoors and indoors, such as in a garage, for enclosing and protecting the motorcycle 12 from damage caused by such natural elements as rain, snow, tree sap, salt spray, etc. Thus, the invention can be considered a mobile and portable housing or garage for vehicles, and especially for motorcycles. The portable covering 10 is lightweight so that it can be easily moved to different locations as desired by the owner and can be easily and quickly set up for use.

Figure 1:
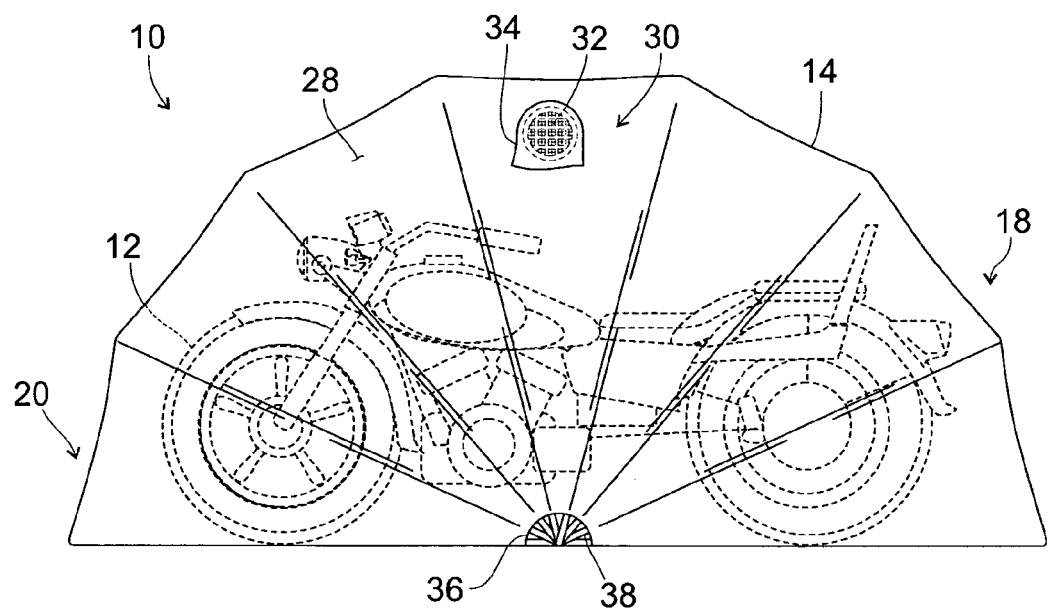
FIG. 1 is a side elevational view of the portable motorcycle covering illustrating the covering in the fully closed disposition for enclosing a motorcycle therein.
Figure 2:
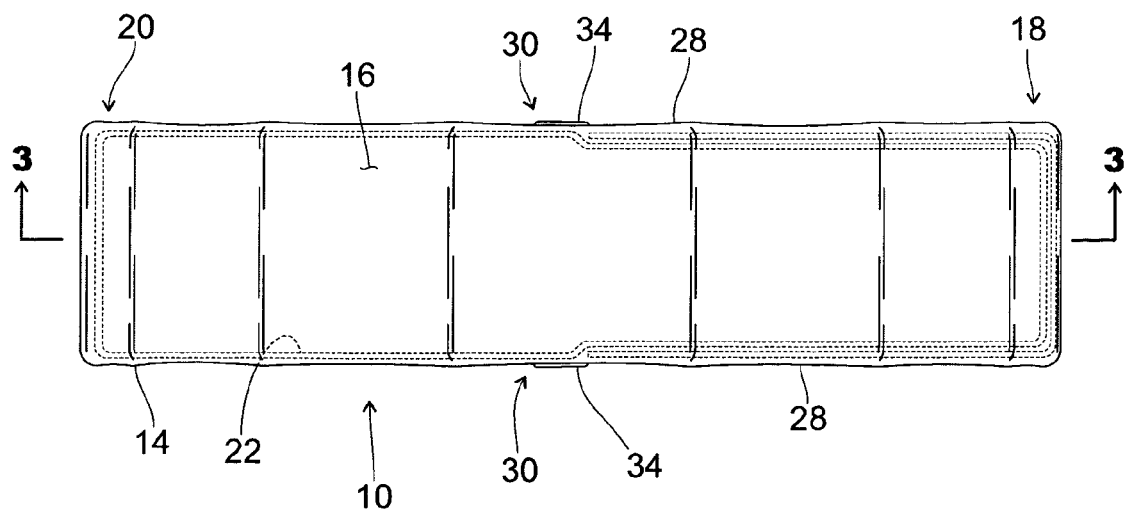
FIG. 2 is a top plan view of the portable motorcycle covering illustrating the arrangement of the floor cover frame.
Figure 6:
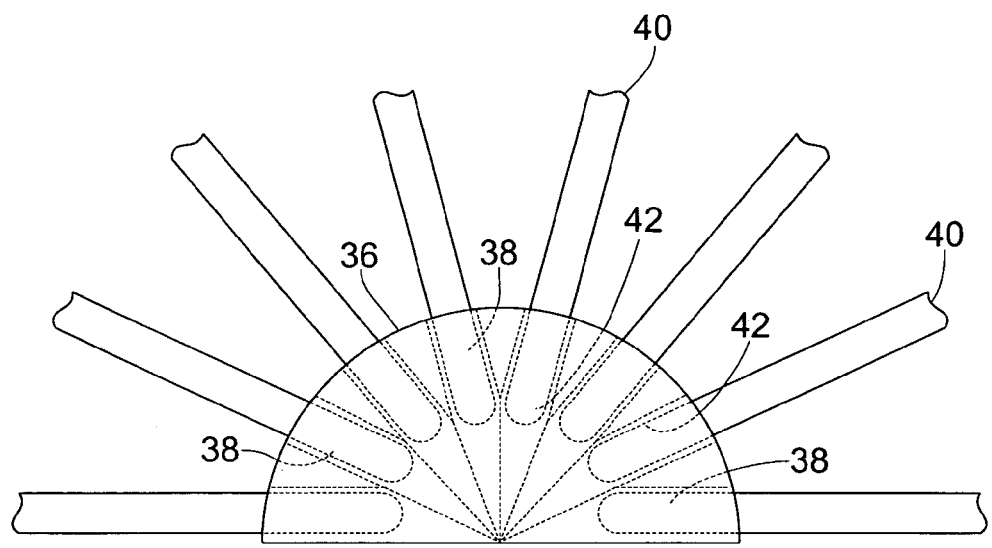
FIG. 6 is a side elevational view of the portable motorcycle covering illustrating the ends of the u-shaped crosspieces received within the slots of the swivel pocket.

As shown in FIGS. 1–7, the portable motorcycle covering 10 is a one-piece unit that includes a flexible collapsible and extensible protective fabric cover 14 attached to a floor cover 16. The floor cover or base 16 includes a front portion 18 and a rear portion 20, with the rear portion 20 having a slightly greater width than the front portion 18 to allow the protective cover 14 to close down over the front portion 18 of the floor cover 16. The floor cover 16 is preferably composed of a water resistant, impervious nylon or polyester material and includes a floor cover frame in the form of floor cover support members 22 that can be tubular fiberglass, aluminum or plastic rods, and which are disposed about the inner periphery of the floor cover 16. The support members 22 are maintained in their position immediately inboard of the lip 24 by being slipped through support member pockets 25 that are spaced along the inner periphery of the floor cover 16 as shown in FIG. 4. The floor cover 16 also includes a circumferential lip 24 that upwardly projects at least 1 and ½ inches from the floor cover 16, and the lip 24 prevents water from coming on or entering and pooling on the floor cover 16. The floor cover support members 22 are disposed immediately inboard of the lip 24 as shown in FIGS. 2, 4 and 5. The floor cover 16 adjacent the rear portion 20 can be connected to the protective cover 14 by fastening members such as snaps, hooks, clips, buttons, hook and loop straps such as that sold under the trademark VELCRO or a zipper; or the protective cover 14 can be integrally attached to the floor cover 16 adjacent the entire rear portion 20. The rear portion 20 of the floor cover 16 is joined to the protective cover 14 in a manner resembling the closed bottom of a bag.

Figure 7:
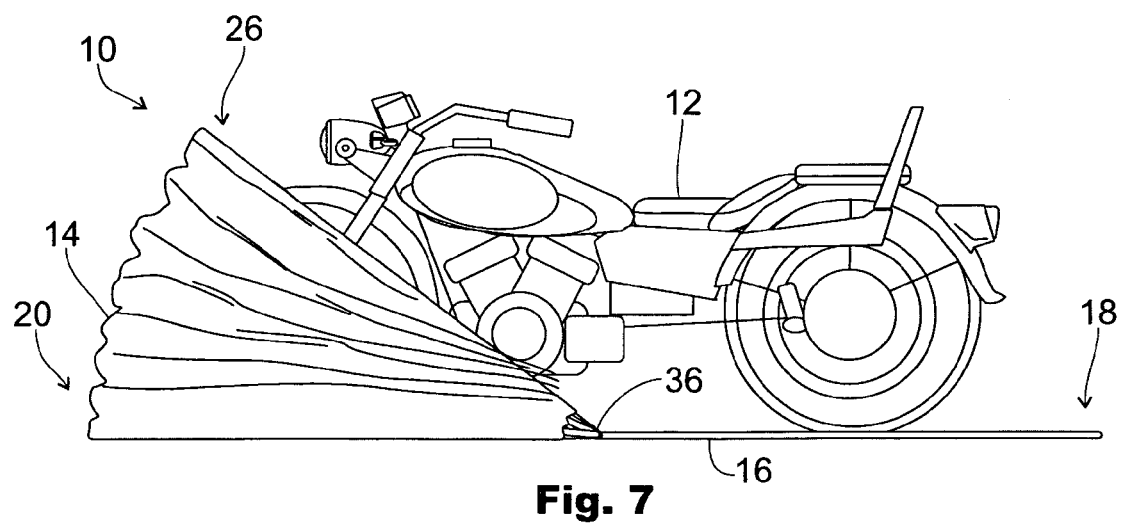
FIG. 7 is a side elevational view of the portable motorcycle covering illustrating the protective cover in the partially collapsed and open disposition.

As shown in FIGS. 1, 3 and 7, the flexible compressible and extensible protective shroud or cover 14 is attached to the floor cover 16, and more specifically, the protective cover 14 is attached about the periphery of the rear portion 20 of the floor cover 16. The protective cover 14 is capable of manual pivotal movement between a compressed, open disposition, as shown in FIG. 7, and a fully closed disposition, as shown in FIGS. 1 and 3 wherein the protective cover 14 fully encompasses and protects the motorcycle 12 from the external environment. This range of motion or movement is approximately 180 degrees. Preferably the protective cover 14 is manufactured or composed of a high quality, water, mildew and UV resistant, silver coated polyester fabric. The protective cover 14 includes an opening or mouth 26 that closes down upon and over the front portion 18 of the floor cover 16 as shown in FIG. 5.

As shown in FIGS. 1, 3 and 7, the protective cover 14 includes side panels 28, and located at the upper central portion of each side panel 28 is a side vent 30. Each side vent 30 includes a mesh-covered vent aperture 32 and a vent covering 34. The side vents 30 provide for ventilation of the interior of the protective cover 14 when the protective cover 14 is fully closed down upon the floor cover 16, as shown in FIG. 1, in order to minimize and prevent moisture and condensation from forming and accumulating within the otherwise sealed protective cover 14. In addition, as shown in FIGS. 1 and 3, located on the inside of each side panel 28 of the protective cover 14, and more specifically, located at the lowermost interior central region of each side panel 28, is a fantail-shaped portion or swivel pocket 36. The swivel pockets 36 are positioned directly opposite of each other on the interior surface of the respective side panels 28, and each swivel pocket 36 further includes a plurality of upwardly opening individual receiving slots or pockets 38. The swivel pockets 36 serve as the pivot points for accommodating and regulating the movement of the protective cover 14 during the opening and closing of the protective cover 14.

As shown in FIGS. 1, 3, 6, and 7, secured to the interior of the protective cover 14 in spaced relation to each other are a plurality of u-shaped support poles or crosspieces 40. Each crosspiece 40 is preferably of lightweight, durable plastic or aluminum and is composed of two or more pole segments for easy assembly, breakdown and transportation. Furthermore, each crosspiece 40 includes, and terminates at, opposed crosspiece ends 42 whereupon each opposed end 42 of each crosspiece 40 is slidably received within a respective slot 38 on each swivel pocket 36. Thus, the swivel pockets 36 interconnect and tie together the crosspieces 40 so that the crosspieces 40 pivot in a sequential and ordered manner during the opening and closing of the protective cover 14. The crosspieces 40 provide for and create the support frame for the protective cover 14 so that the protective cover 14 is able to span and encompass the motorcycle 12 but avoid contact with the motorcycle 12 when deployed over the motorcycle 12. The crosspiece 40 adjacent the mouth or opening 26 of the protective cover 14 may be referred to as the leading crosspiece, and this crosspiece 40 is manually gripped and pivoted by the user for initiating the sequential pivotal movement of all the other crosspieces 40 to open and close the protective cover 14. The crosspieces 40 and the floor cover support members 22 can be secured to the interior surface of the protective cover 14 by various types of fastening members 44 such as, for example, snaps, hooks, clips, ties, hook and loop straps such that sold under the trademark VELCRO zipper, etc. The fastening means or members should allow for the easy removal of the crosspieces 40 for disassembly, transport and assembly of the portable motorcycle covering 10. In addition, the crosspieces 40 and the support members 22 are composed of the interconnected pole segments, and the pole segments are held in their extensible position by bushings 46; and this further contributes to the easy assembly, disassembly, and transportation of the portable covering 10.

Thus, when the protective cover 14 is in the open position, as shown in FIG. 7, the crosspieces 40 are lying to one side of the swivel pockets 36 adjacent the rear portion 20 of the floor cover 16 and are essentially stacked upon each other as the protective cover 14 is in the collapsed and open disposition. The motorcycle 12 can then be parked on the floor cover 16. The user would then grip the leading crosspiece 40 adjacent the opening 26 of the protective cover 14 and rotate that crosspiece 40 on the swivel pockets 36 (that define the pivot points for the crosspieces 40) approximately 180 degrees. As the other crosspieces 40 are interconnected at the swivel pockets 36 and secured to the protective cover 14, this action by the user causes the other crosspieces 40 to follow in automatic and sequential pivotal movement and the concomitant folding of the protective cover 14 over the motorcycle 12. When the opening 26 of the protective cover 14 is positioned adjacent the rear portion 20 of the floor cover 16, as shown in FIGS. 3 and 5, the crosspieces 40 will be spaced from each other between 0 and 90 degrees thereby creating the support frame for the protective cover 14; and for allowing the protective cover 14 to fully span the motorcycle 12 without contacting the motorcycle 12. It should be noted that it is only the leading crosspiece 40 gripped by the user that pivots approximately 180 degrees for closing and opening the protective cover 14. In order to open the protective cover 14 to remove the motorcycle 12, the user would grip the leading crosspiece 40 positioned adjacent, over and outboard of the floor cover 16 at the front portion 18 thereof, as shown in FIGS. 3 and 5, and rotate that crosspiece 40 approximately 180 degrees backward to the rear portion 20 of the floor cover 16. The other crosspieces 40 will follow and pivot rearward thereby causing the protective cover 14 to fold and collapse upon itself in accordion-like manner, as shown in FIG. 7, and uncover the motorcycle 12. It should also be noted that when using the portable covering 10 outdoors, additional stability can be added by using tethers, ropes and stakes to anchor and secure the protective cover 14 and the floor cover 16 to the ground. These tethers, ropes and stakes can be similar to, or the same as, those used to stake a camping tent to the ground.

While the invention has been described with respect to a specific embodiment, it should be understood that numerous alterations, modifications, and variations may be made by one skilled in the art without departing from the scope of the invention as set forth in the following appended claims.

I claim:

1. A portable motorcycle covering, comprising:
   an elongated floor cover on which the motorcycle can be parked, and the floor cover having a circumferential lip;
   a flexible collapsible and extensible protective cover attached to the floor cover and capable of being manually and pivotally deployed between an open position for uncovering the motorcycle and a closed position for covering the motorcycle;
   a plurality of u-shaped crosspieces attached to the interior surface of the protective cover and forming a support frame for the protective cover so that the protective cover completely encompasses the motorcycle when the protective cover is disposed to the closed position;
   the protective cover including a pair of opposed fantail-shaped portions attached at the lowermost central regions of the interior side surfaces of the protective cover with each fantail-shaped portion having pockets for receiving therein the ends of the crosspieces thereby allowing for the sequential pivotal movement of the crosspieces for closing and opening the protective cover; and
   the protective cover having an opening that fits outboard of the lip of the floor cover when the protective cover is closed on the motorcycle and the opening being supported by one crosspiece defined as the leading crosspiece that is manually pivotable by the individual for initiating the pivotal movement of the other crosspieces for deploying the protective cover to the closed and open dispositions.

2. The portable motorcycle covering of claim 1 wherein the protective cover includes a pair of opposed mesh-covered vents with each vent located at the upper central region of the sides of the protective cover in order to prevent the accumulation of moisture and condensation within the protective cover when the protective cover is closed on the motorcycle.

3. The portable motorcycle cover of claim 2 wherein the floor cover includes a rear portion and a front portion with the width of the rear portion being greater than the width of the front portion.

4. The portable motorcycle cover of claim 3 wherein the circumferential lip of the floor cover upwardly extends at least 1 and ½ inches from the floor cover frame.

5. The portable motorcycle cover of claim 4 wherein the fantail-shaped portions having the pockets for receiving the ends of the crosspieces serve as the pivot points for the crosspieces for allowing the pivotal movement of the crosspieces between the open position and the closed position.

6. The portable motorcycle cover of claim 5 wherein the leading crosspiece adjacent the opening of the protective cover is capable of pivotal movement between a range of 0 degrees wherein the protective cover is in the open position to 180 degrees for disposing the protective cover to the closed position.

7. The portable motorcycle cover of claim 6 wherein the pivotal movement of the leading crosspiece from the open position to the closed position causes the other crosspieces to pivot to positions between 0 and 90 degrees from each other thereby creating the support frame that allows the protective cover to completely span and enclose the motorcycle.

8. The portable motorcycle cover of claim 7 wherein the protective cover is composed of an ultraviolet resistant, silver coated polyester fabric.

9. A portable vehicle covering for completely enclosing therein a parked vehicle, comprising:
   an elongated floor cover on which the vehicle can be parked and having a front portion, a rear portion, and a circumferential lip;
   a collapsible and extensible flexible protective cover attached to the floor cover and capable of being manually and pivotally deployed between an open position wherein the vehicle is uncovered and a closed position wherein the vehicle is completely enclosed by the protective cover;
   a plurality of u-shaped crosspieces attached to the inside surface of the protective cover and forming a support frame for the protective cover so that the protective cover can completely enclose the vehicle when the protective cover is disposed to the closed position;

a pair of fantail-shaped portions attached at the lowermost central regions of the interior side surfaces of the protective cover with each fantail-shaped portion having pockets for receiving therein the ends of the crosspieces thus allowing for the sequential pivotal movement of the crosspieces for closing and opening the protective cover; and the protective cover having an opening that fits outboard of the lip of the floor cover when the protective cover is in the closed disposition and the opening supported by one crosspiece defined as the leading crosspiece that is manually pivotable by the user whereupon the other crosspieces follow in sequential pivotal motion thus causing the protective cover to be deployed to the closed or the open disposition.

10. The portable vehicle covering of claim 9 wherein the protective cover includes a pair of opposed mesh-covered vents with each vent located at the upper central region of the respective sides of the protective cover.

11. The portable vehicle covering of claim 10 wherein the width of the rear portion of the floor cover is greater than the width of the front portion of the floor cover.

12. The portable vehicle covering of claim 11 wherein the circumferential lip extends upwardly from the floor cover at least 1 and ½ inches.

13. The portable vehicle covering of claim 12 wherein the fantail-shaped portions having the pockets that receive the ends of the crosspieces serve as the pivot points for the crosspieces the allowing for the sequential pivotal movement of the crosspieces between the open disposition and the closed disposition.

14. The portable vehicle covering of claim 13 wherein the leading crosspiece adjacent the opening of the protective cover is capable of pivotal movement between a range of 0 degrees wherein the protective cover is in the open disposition to 180 degrees wherein the protective cover is placed in the closed disposition for enclosing the vehicle.

15. The portable vehicle covering of claim 14 wherein the pivotal movement of the leading crosspiece from the open disposition to the closed disposition causes the other crosspieces to pivot to positions that are between 0 and 90 degrees from each other thus forming the support frame so that the protective cover can completely span and enclose the vehicle parked on the floor cover frame.

16. The portable vehicle covering of claim 15 wherein the protective cover is composed of an ultraviolet resistant, silver coated polyester fabric.

* * * * *